(No Model.) 3 Sheets—Sheet 1.

T. & H. HALE & S. D. HARVEY.
HAY COCKING MACHINE.

No. 371,314. Patented Oct. 11, 1887.

WITNESSES:
Dom Twitchell
C. Sedgwick

INVENTOR:
T. Hale
H. Hale
S. D. Harvey
BY Munn & Co
ATTORNEYS.

(No Model.) 3 Sheets—Sheet 2.
T. & H. HALE & S. D. HARVEY.
HAY COCKING MACHINE.

No. 371,314. Patented Oct. 11, 1887.

WITNESSES: INVENTOR:
Donn Twitchell T. Hale
C. Sedgwick H. Hale
S. D. Harvey
BY Munn & Co
ATTORNEYS.

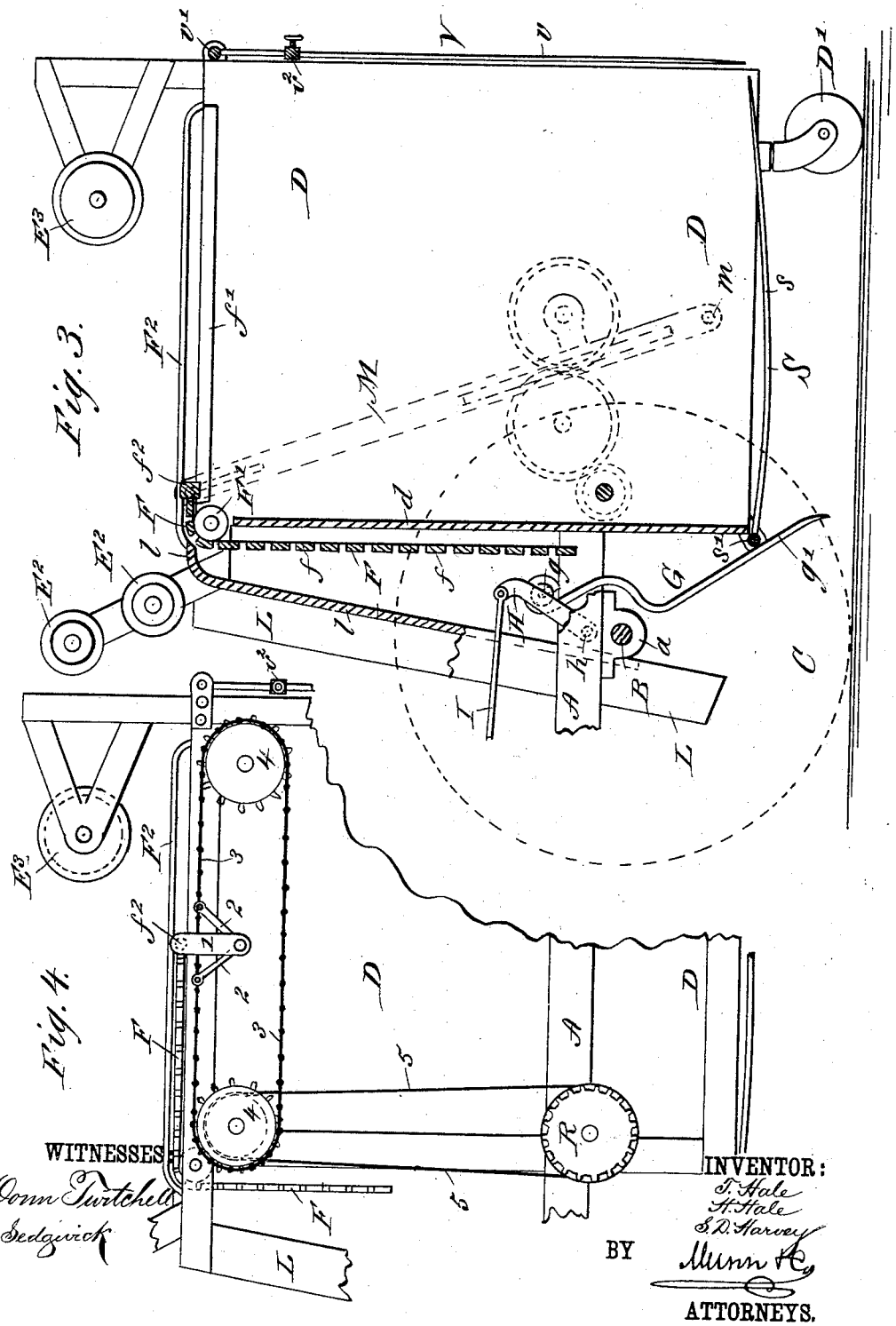

UNITED STATES PATENT OFFICE.

THOMAS HALE, HENRY HALE, AND SYLVENOUS D. HARVEY, OF WALES, NEW YORK, ASSIGNORS TO SAID THOMAS HALE AND HENRY HALE.

HAY-COCKING MACHINE.

SPECIFICATION forming part of Letters Patent No. 371,314, dated October 11, 1887.

Application filed October 30, 1886. Serial No. 217,577. (No model.)

*To all whom it may concern:*

Be it known that we, THOMAS HALE, HENRY HALE, and SYLVENOUS D. HARVEY, all of Wales, in the county of Erie and State of New York, have invented a new and Improved Hay-Cocking Machine, of which the following is a full, clear, and exact description.

Our invention relates to a machine adapted for gathering a scattered hay or other fodder crop from a field and discharging the fodder to the ground in compact piles or cocks for protection against storms; and the invention has for its object to provide a simple and comparatively inexpensive machine of this character which may be operated by a single attendant who drives the horses drawing the machine, and will cock the hay quickly in emergencies, thereby preventing serious injury to the crop.

The invention consists in certain novel features of construction and combinations of parts of the hay-cocking machine, all as hereinafter fully described and claimed.

Reference is to be had to the accompanying drawings, forming a part of this specification, in which similar letters of reference indicate corresponding parts in all the figures.

Figure 1:
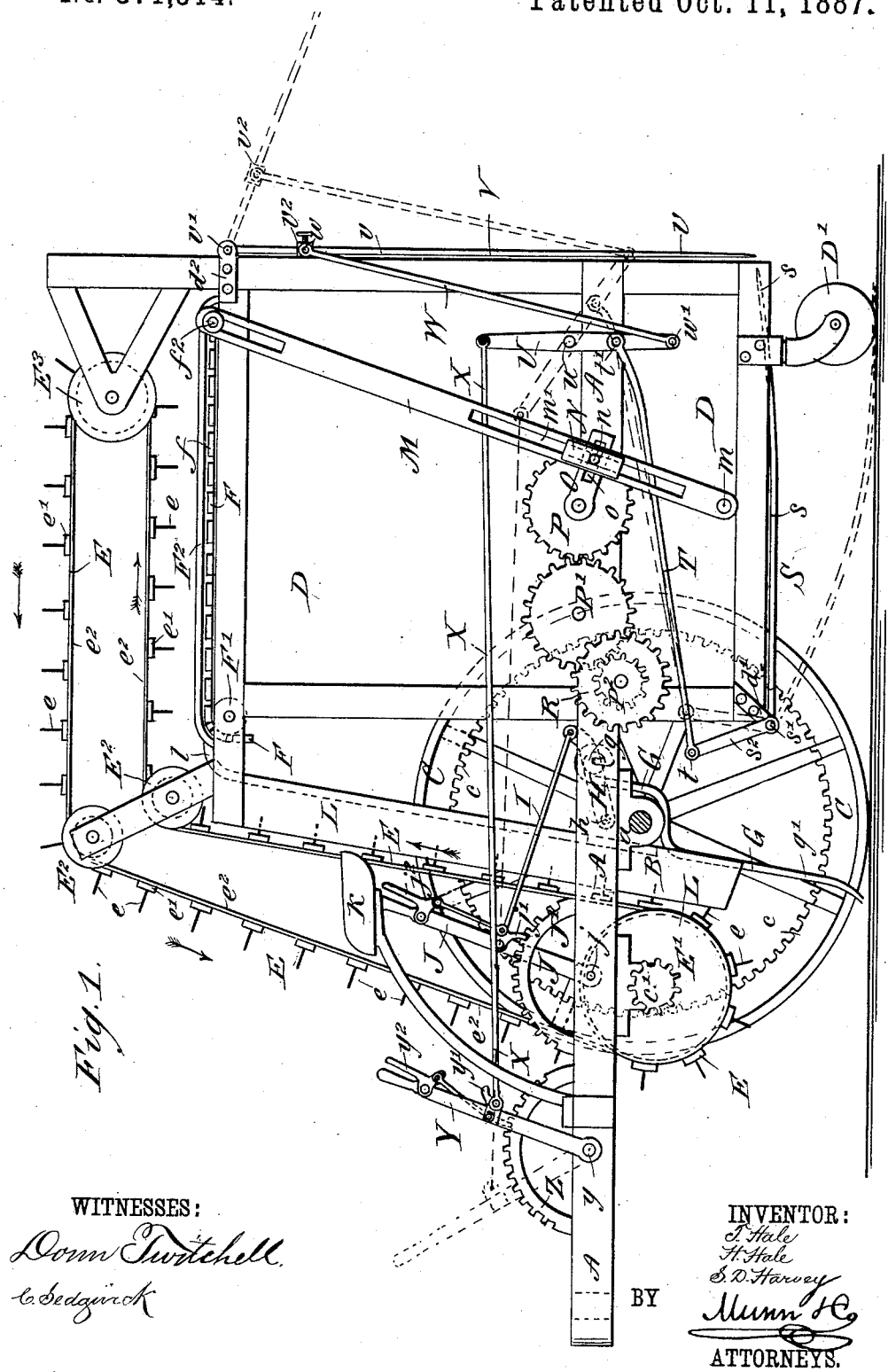
Figure 2:
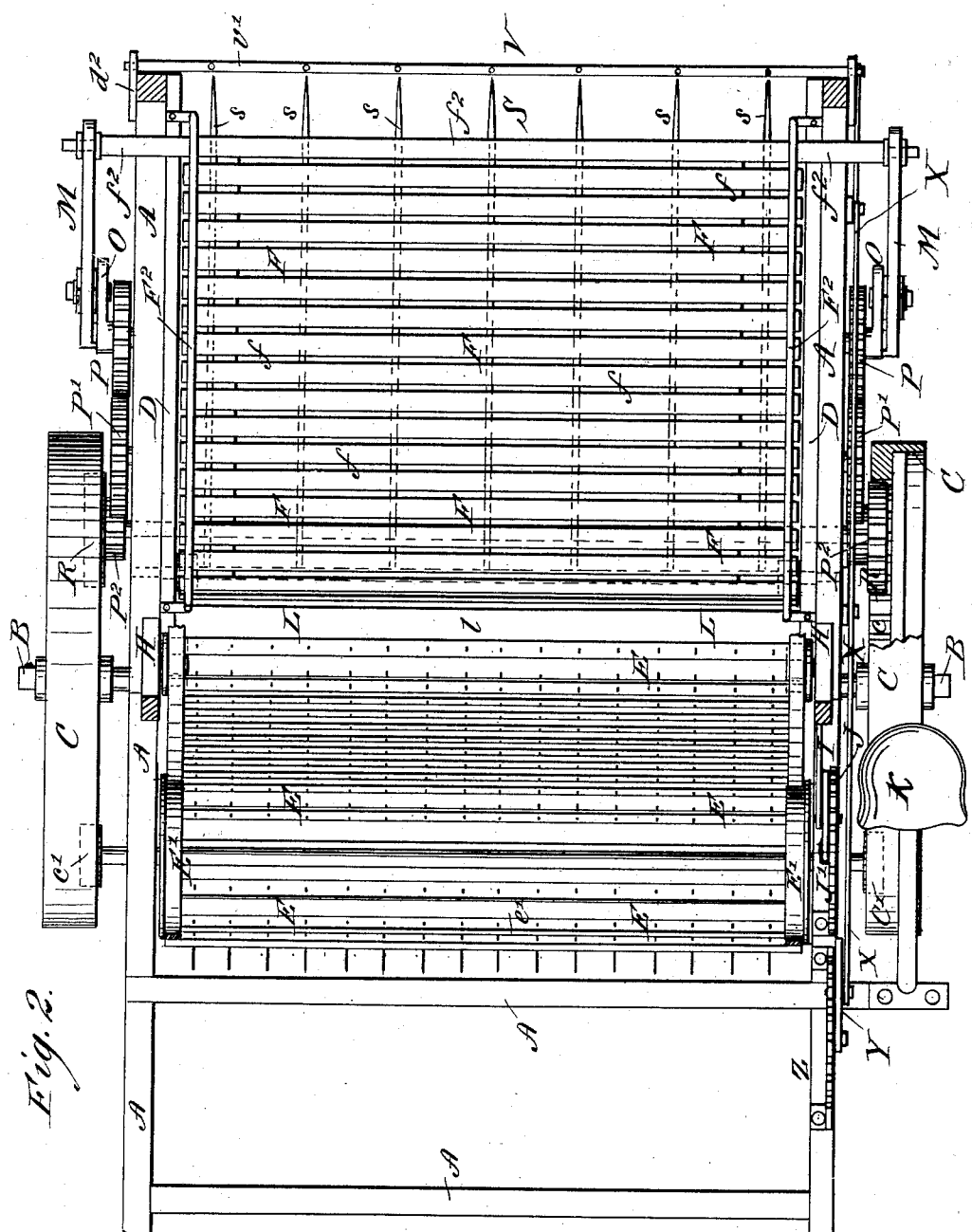

Figure 1 is a side elevation of our improved hay-cocking machine with one of the drive-wheels removed and the axle in section, and with parts indicated in different positions in dotted lines. Fig. 2 is a plan view of the machine partly broken away and in section. Fig. 3 is a detail vertical sectional elevation mainly of the hay-receiving box and the distributer, and shows the hay-rake in inoperative position; and Fig. 4 is a detail side view intended especially to illustrate a modified form of mechanism for operating the distributer above the receiving-box.

The main horizontal frame A of the machine has fixed to it suitable bearings, $a$, in which is journaled an axle or shaft, B, on which the two opposite side wheels, C C, are fixed. These wheels give support to the machine and serve also as drivers to its mechanism, as hereinafter explained. To the main frame A there is fastened or held a box, D, which receives the hay or other fodder crop from the elevator E and distributer F, the latter working back and forth over the open top of the box, as presently described, while the elevator receives or takes the hay from a rake, G, which lifts the hay from the ground as the machine is drawn along it by one or more horses hitched to the main frame A in any approved way.

The hay-rake G comprises a series of tines, $g'$, which are fixed to a transverse shaft, $g$, made fast to arms or levers H H, pivoted at $h$, one at each side of the frame A, and to one of the levers H is connected one end of a rod, I, the other end of which is attached to a lever, J, which is pivoted at $j$ to the frame A, and is provided with an ordinary pawl, $j'$, connected to a spring-pressed trip-lever, $j^2$, and adapted to engage a rack-bar, J', fixed to the frame A, for locking the lever J, and consequently the rake G, in any desired position. The lever J is within easy reach of a driver or attendant on the seat K, and when he throws the lever backward the rake G will be thrown forward with the outturned lower ends or points of its tines quite close to the ground to lift the scattered hay or other fodder crop therefrom, and the hay will pass up the tines onto the floor or back $l$ of an inclined slide, L, which is fixed to the main frame A and to projecting top rails of the frame of the box D, the floor of the slide being held some little distance away from the front wall of the box to give space for the operation of the flexible distributer F, as presently described.

As the hay rises toward or upon the upper parts of the rake-tines and to the slide L, the hay is caught by the elevator E, which is composed of a series of slats, $e'$, having pins $e$ fixed therein and attached to suitable flexible webbing or bands, $e^2$, adapting the elevator-belt to run easily over pulleys E', journaled in bearings on the main frame A at or near the lower end of the slide L, and over guide-pulleys $E^2$ $E^2$, journaled in arms or brackets fixed to the box D, and over return-pulleys $E^3$, journaled to arms or brackets held to and above the back end of the box, and whereby the elevator-belt is caused to travel in direction of the arrows, with its lower inner side in an angular path about parallel with the floor of the slide L and the open top of the box D, as clearly shown in Fig. 1 of the drawings. Consequently the hay will be carried upward from the rake G and laid on the distributer F by the elevator-belt, which receives motion through the medium of pinions $c'$ on the shaft of the pulleys $E'$ engaging internal gears, $c$, formed on the drive-wheels.

The distributer F is composed of a series of slats, $f$, which are fixed to flexible webbing or bands, thus allowing the distributer to move freely over and hang from a roller, $F'$, journaled across the upper forward corner of the box D. The opposite ends of the distributer-slats rest upon cleats $f'$, fixed to the sides of the box, and retaining or guide rods $F^2$ are fixed to the box and range above the slats to prevent buckling of the distributer and insure its travel in true horizontal plane backward and forward over the open top of the receiving-box. The slats of the distributer are separated a little edgewise in the drawings, the better to show the construction; but when we use the slats we will attach them to the webbing so they lie as closely as may be to each other edgewise to prevent entrance of the hay between them. If preferred, the distributer-bed may consist of a thin sheet of flexible metal or heavy canvas or other fabric which will readily bend over the roller $F'$ and pass down between the receiving-box and the slide into a position clearly shown in Fig. 3.

We next describe mechanism for operating the distributer, with reference to Figs. 1, 2, and 3 of the drawings, as follows: At each side of the box D there is pivoted at $m$ the lower end of a bar, M, and the upper ends of the two bars M M have a pin-and-slot connection with a cross-bar, $f^2$, fixed at the back end of the distributer F. Each bar M is also slotted in its lower part at $m'$, and in this slot there is fitted to slide a block, N, having a wrist-pin, $n$, which enters a slot, $o$, in a crank-arm, O, on the shaft of a gear-wheel, P, journaled to the side of the hay-box, or on the main frame A. The gear-wheel P meshes with a gear-wheel, $P'$, which meshes with a gear-wheel, $P^2$, the shaft of which carries a gear-wheel, R, which meshes with the drive-wheel gear $c$. With this construction the bars M M at each side of the hay-box will be swung forward and backward in unison by the advance of the machine, to cause the hay-distributer to be carried backward over the box, as in Fig. 1, and forward, or in the reverse direction, to the position shown in Fig. 3. This alternate backward and forward movement of the distributer in connection with the rearward travel of the elevator-belt immediately over the distributer and the box causes the hay to be carried rearward from the top of the slide L and laid evenly in the receiving-box D.

Other mechanism than that above described may be used for operating the distributer—for example, that shown in Fig. 4 of the drawings, and which comprises an arm, 1, fixed to each end of the rear cross-bar, $f^2$, of the distributer and connected by links 2 2 with a chain belt, 3, which runs over chain-wheels 4 4 and is driven by a belt, 5, leading from a pulley fixed to the gear-wheel R, operated by the drive-wheel.

The open topped box D preferably has a solid wood or metal front, $d$, and the hinged floor and hinged back of the box are each preferably formed of metal rods in fork-like structure. The bottom or floor S of the box is composed of a series of rods or tines, $s$, which are fixed to a cross-bar, $s'$, journaled to lugs $d'$ at the lower forward corners of the hay-box. To one end of this cross-bar $s'$ is fixed a crank-arm, $s^2$, to the outer end of which is connected at $t$ one end of a rod, T, the back end of which is pivoted at $t'$ to a lever, U, fulcrumed at $u$ to the side bar of the frame A, or a lug or plate fixed thereto. The back V of the box is composed of a series of tines or rods, $v$, which are fixed to a cross-bar, $v'$, journaled to lugs $d^2$ at the rear upper corners of the box D, and to an outer tine $v$ there is fastened adjustably by a set-screw, as shown in Fig. 1, or otherwise, a slip collar or block, $v^2$, to which is connected at $w$ one end of a rod, W, the other end of which is pivoted at $w'$ to the end of the lever U below the point of connection at $t'$ of the rod T with said lever.

To the upper end of the lever U is connected the back end of a pull-rod, X, which is attached at its forward end to a hand-lever, Y, fulcrumed at $y$ to the frame A and in reach of the attendant on the seat K. The lever is provided with a spring pressed pawl, $y'$, connected to a trip-lever, $y^2$. The pawl $y'$ is adapted to engage a rack-bar, Z, fixed to the frame A. It is obvious that by pulling back this lever Y to the position shown in full lines in Fig. 1 of the drawings the floor S and back V of the hay-receiving box D will be closed simultaneously to hold the hay received from the distributer, and when the box is filled the attendant, by pushing the lever Y forward to the position shown in dotted lines in Fig. 1, will simultaneously lower the box-bottom S and raise its back V, as in dotted lines, to quickly discharge the hay or fodder from the box in a perfect cock well calculated to protect the hay from impending rain-storms.

By adjusting the block $v^2$ along the rod of the back V the extent of opening of the back may be regulated at will to insure the most compact discharge of the fodder from the box. After the fodder is discharged the box may be instantly closed by operating the lever Y.

To relieve the frame from considerable of the weight of the loaded box D, we will support the back part of the box on one or more caster-wheels, $D'$, as shown in Figs. 1 and 3 of the drawings.

The drive-wheels will be provided with suitable pawl-and-ratchet mechanism, allowing disengagement of one wheel in turning the machine while the other wheel gives motion to the operating parts, and also allowing both drive-wheels to be thrown out of gear when backing the machine.

Having thus fully described our invention, we claim as follows and desire to secure by Letters Patent—

1. In a machine for cocking hay, the combination, with a supporting frame, of a hay-receiving box thereon, a rake adapted to gather the hay from the ground, devices for conducting the raked hay to the open top of the box, and a flexible distributer reciprocating back and forth over the open top of the box, substantially as described, for the purposes set forth.

2. In a machine for cocking hay, the combination, with a supporting-frame, a hay-receiving box thereon, and a slide receiving hay from a rake which lifts it from the ground, of a flexible distributer arranged for reciprocation at the open top of the box and adapted to fold or hang between the box and the slide as it moves to uncover the top of the box, substantially as herein set forth.

3. In a machine for cocking hay, the combination of a supporting-frame, a hay-receiving box thereon, a rake mounted on the frame and adapted to gather the hay from the ground, a slide receiving the hay from the rake, an elevator operating in front of the slide and over the box to carry the raked hay up the slide and above the box, and a flexible distributer reciprocating back and forth over the open top of the box and between the elevator and the said open top of the box, substantially as described, for the purposes set forth.

4. In a machine for cocking hay, the combination, with the open-topped hay-receiving box and a flexible distributer arranged to reciprocate thereover, of guides preventing buckling of the distributer, substantially as herein set forth.

5. In a machine for cocking hay, the combination, with a frame, drive-wheels supporting it and having gears $c$, a hay-receiving box, means for raising the hay thereto, and a flexible distributer arranged for reciprocation above the box, of pivoted levers M, connected to the distributer and slotted at $m'$, blocks N in said levers, slotted crank-arms O, connected to the blocks and to gear-wheels P, and gearing connecting the wheels P with the drive-wheel gears, substantially as shown and described.

6. In a hay-cocking machine, the combination, with a supporting-frame and a hay-receiving box thereon, of a fixed slide on the frame in front of the box, a rake pivoted to supports back of the slide, an elevator-belt working in front of the slide and over the top of the hay-box, a flexible distributer reciprocating back and forth over the open top of the box, and means for operating the rake, elevator, and distributer, substantially as herein shown and described.

7. In a hay-cocking machine, the combination, with a frame, and a hay-receiving box thereon provided with hinged bottom and back, of a fixed slide on the frame in front of the box, a rake pivoted to supports back of said slide, an elevator-belt traveling in front of the slide and over the top of the box, a flexible distributer reciprocating back and forth over the open top of the hay-box between it and the elevator, and means for operating the said hinged bottom and back, substantially as herein shown and described.

THOMAS HALE.
HENRY HALE.
SYLVENOUS D. HARVEY.

Witnesses:
W. D. JONES,
JAMES B. RAGAN.